(12) United States Patent
Thelen et al.

(10) Patent No.: US 9,764,690 B2
(45) Date of Patent: Sep. 19, 2017

(54) SELF-PROPELLED GROUND MILLING MACHINE, IN PARTICULAR ROAD MILLING MACHINE, RECYCLER, STABILIZER OR SURFACE MINER, WITH INTEGRATED MAINTENANCE PLATFORM

(71) Applicant: BOMAG GmbH, Boppard (DE)

(72) Inventors: Thomas Thelen, Monreal (DE); Moritz Starkmeth, Koblenz (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 14/739,437

(22) Filed: Jun. 15, 2015

(65) Prior Publication Data
US 2016/0001818 A1    Jan. 7, 2016

(30) Foreign Application Priority Data

Jun. 17, 2014    (DE) .......................... 10 2014 009 014

(51) Int. Cl.
*E01C 23/088*    (2006.01)
*B60R 3/02*    (2006.01)
(Continued)

(52) U.S. Cl.
CPC ............... *B60R 3/02* (2013.01); *B60R 3/002* (2013.01); *B62D 25/10* (2013.01); *E01C 23/088* (2013.01); *E01C 23/127* (2013.01)

(58) Field of Classification Search
CPC ............................. E01C 23/127; E02F 9/0833
(Continued)

(56) References Cited

U.S. PATENT DOCUMENTS 3,860,083 A * 1/1975 Yancey ................. B62D 33/00
                                                          180/69.2
4,021,071 A * 5/1977 Norman ................ E02F 9/0833
                                                          182/84
(Continued)

FOREIGN PATENT DOCUMENTS

DE         601 03 876 T2    6/2005
DE    10 2012 019 016 A1    4/2014
(Continued)

OTHER PUBLICATIONS

ESPACENET, English Machine Translation of DE60103876T2, published on Jun. 30, 2005, retrieved from http://worldwide.espacenet.com on Jun. 10, 2015 (6 pages).
(Continued)

*Primary Examiner* — David Bagnell
*Assistant Examiner* — Michael Goodwin
(74) *Attorney, Agent, or Firm* — Wood Herron & Evans LLP

(57) ABSTRACT

The present invention relates to a self-propelled ground milling machine, comprising a drive engine arranged in an engine compartment and an engine compartment enclosure which covers the engine compartment at least partly to the sides and to the top. A part of the engine compartment enclosure is a cover which is adjustable between a covering position and a maintenance position. At the same time, a maintenance platform is provided which is movable between a stowage position and a maintenance position. When the maintenance platform is in the maintenance position, an operator standing on the floor surface of the maintenance platform can carry out maintenance work in the engine compartment of the self-propelled ground milling machine. The self-propelled ground milling machine preferably is a
(Continued)

road milling machine, more particularly a large milling machine, a surface miner, a stabilizer or a recycler.

25 Claims, 11 Drawing Sheets

(51) Int. Cl.
  *E01C 23/12* (2006.01)
  *B62D 25/10* (2006.01)
  *B60R 3/00* (2006.01)

(58) Field of Classification Search
  USPC .................................................. 180/89.17
  See application file for complete search history.

(56) References Cited

U.S. PATENT DOCUMENTS

| | | |
|---|---|---|
| 6,276,758 B1 | 8/2001 | Hoffmann et al. |
| 2002/0189899 A1* | 12/2002 | Hedley ............... B60R 3/02 182/84 |
| 2003/0051931 A1 | 3/2003 | Johansson et al. |
| 2014/0015303 A1* | 1/2014 | Denson ............... E01C 23/088 299/39.2 |
| 2014/0035344 A1* | 2/2014 | Huhn .................. E01C 23/088 299/36.1 |

FOREIGN PATENT DOCUMENTS

| | | |
|---|---|---|
| DE | 10 2013 020 679 A1 | 6/2014 |
| EP | 2 216 238 B1 | 10/2011 |

OTHER PUBLICATIONS

ESPACENET, English Machine Translation of DE102012019016A1, published on Apr. 10, 2014, retrieved from http://worldwide.espacenet.com on Jun. 10, 2015 (11 pages).
ESPACENET, English Machine Translation of DE102013020679A1, published on Jun. 5, 2014, retrieved from http://worldwide.espacenet.com on Jun. 10, 2015 (13 pages).

* cited by examiner

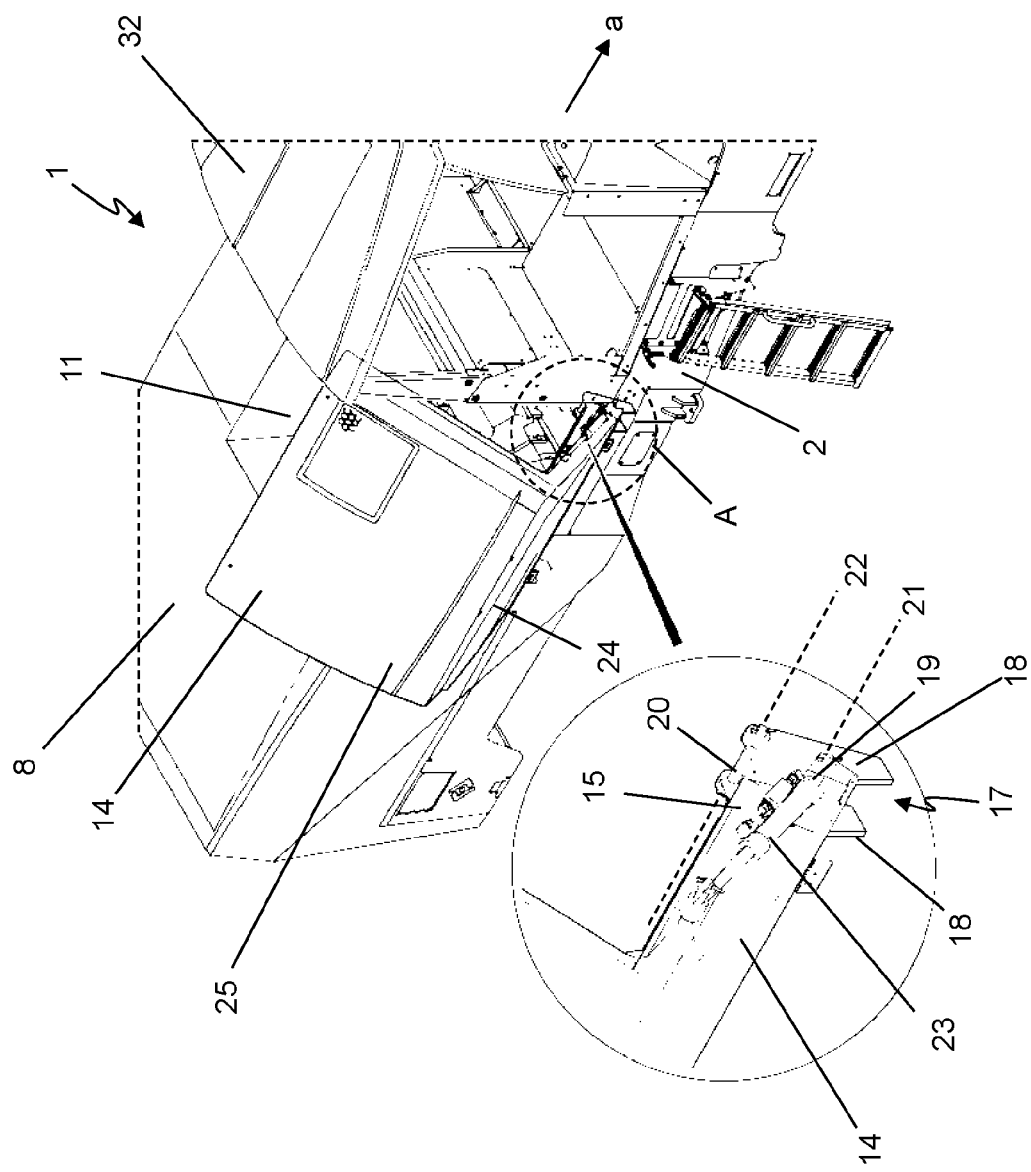

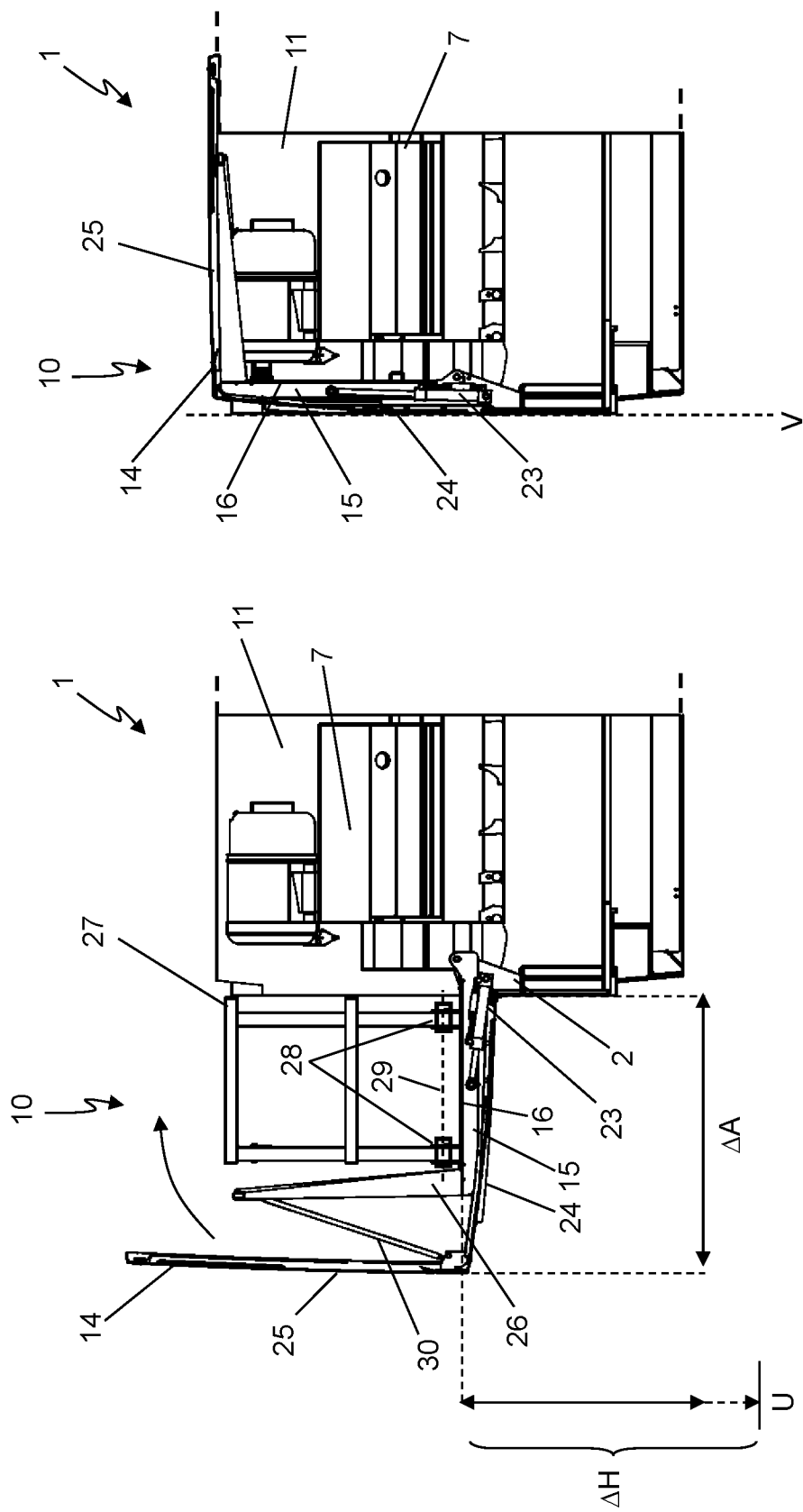

SELF-PROPELLED GROUND MILLING MACHINE, IN PARTICULAR ROAD MILLING MACHINE, RECYCLER, STABILIZER OR SURFACE MINER, WITH INTEGRATED MAINTENANCE PLATFORM

CROSS-REFERENCE TO RELATED APPLICATION

The present application claims priority under 35 U.S.C. §119 of German Patent Application No. 10 2014 009 014.0, filed Jun. 17, 2014, the disclosure of which is hereby incorporated herein by reference in its entirety.

FIELD OF THE INVENTION

The present invention relates to a self-propelled ground milling machine, in particular, a road milling machine, recycler, stabilizer or surface miner, comprising a drive engine arranged in an engine compartment and an engine compartment enclosure which covers the engine compartment at least partly to the sides and to the top, at least a part of the engine compartment enclosure being a cover which is adjustable between a covering position and a maintenance position. The present invention relates, in particular, to a road milling machine implemented as a large milling machine.

BACKGROUND OF THE INVENTION

Self-propelled ground milling machines are used for milling the underlying ground. What these machines have in common is that they have as a working device a milling drum carried by a machine frame, which milling drum is lowered into the subgrade soil in working operation and is guided in the soil along the milling track by the advancing machine. The milling drum, which comprises a plurality of milling devices on its outside jacket surface, rotates in working operation about an axis of rotation extending horizontally and transversely to the working direction. The lowering may occur, for example, by a lowering of the machine frame or by a lowering relative to the machine frame. The milling drum is mounted in a milling drum box, which is connected with the machine frame, for example. The ground milling machines relevant in the present context are self-propelled, i.e., travel by means of self-propulsion. Road milling machines, in particular, so-called road cold milling machines, are used for the milling, grinding and removal of road pavement layers, for example, asphalt and concrete layers. A generic road milling machine, in particular, of the large milling machine type, is described in DE 10 2012 019 016 A1, for example, which is herewith incorporated herein by reference. Stabilizers and recyclers are used for the milling of subgrade soil material, the blending of binders and/or water into the subgrade soil and/or the recycling of subgrade soil material, for example, in road and path construction. Such machines are described in DE 10 2013 020 679 A1, which is also incorporated herein by reference. So-called surface miners, on the other hand, are sometimes very large machines and are used for the extraction of natural resources, in particular, in surface mining operation. A typical surface miner is described in U.S. Pat. No. 6,276,758 B1, which is herewith incorporated herein by reference.

Ground milling machines, in particular, road milling machines, recyclers, stabilizers or surface miners, normally have large dimensions and a partly contorted configuration, so that it is often difficult for operators to reach all relevant positions for maintenance purposes, for example. This regularly applies, in particular, to the drive engine in the engine compartment, which usually requires a large amount of maintenance work and whose maintenance points are often difficult to reach. The drive engine is usually an internal combustion engine which is arranged in the interior of the ground milling machine, for example, mounted on a machine frame. An arrangement space is provided for this purpose, which is designated in the present case as the engine compartment. For protective purposes and/or for noise insulation, the engine compartment is frequently implemented as covered. The drive engine is thus not exposed, but is protected from the ambient environment. The entirety of said covering structure will be designated below as the engine compartment enclosure. The covering of the engine compartment occurs especially at least to the sides (in the horizontal direction) and upwardly in the vertical direction. It is now necessary for maintenance work that the operator is granted access from the outside to the interior space of the engine compartment in order to service the drive engine. The engine compartment enclosure frequently comprises a cover for this purpose which is adjustable between a covering position and a maintenance position. The cover is thus part of the engine compartment enclosure and designates an adjustable flat element which in its maintenance position releases an opening for access to the engine compartment from the outside. Such a cover is regularly a bonnet or an engine cover flap.

It is common practice, especially in the case of self-propelled ground milling machines of large dimensions, that maintenance occurs from an operator platform. The operator platform designates the location from which the operation of the ground milling machine occurs in working operation. In order to reach all points that are relevant for maintenance, floor surfaces are frequently arranged in the interior of the engine compartment on which the operator, coming from the operator platform, can stand within the engine compartment. This solution is, however, disadvantageous in several respects. On the one hand, the available space within the engine compartment is very small. On the other hand, there is a constant risk that the operator will access positions which are not intended for this purpose, thus causing damage to the engine or the respective elements within the engine compartment. Moreover, there is further a considerable risk of injury to the operator, e.g., by contact with hot engine parts, sharp cutting edges, etc.

SUMMARY OF THE INVENTION

It is the object of the present invention to provide a generic ground milling machine, in particular, a road milling machine, stabilizer, recycler or surface miner, in which the operator can reach positions relevant for maintenance within the engine compartment more easily, wherein the solution is to be arranged at the same time in a compact manner on the ground milling machine and shall prevent that the operator needs to climb within the engine compartment for maintenance purposes.

All statements made hereinafter with reference to a ground milling machine are to be understood as referring, in particular, to a road milling machine, stabilizer, recycler or surface miner.

One aspect of the present invention consists in a movable maintenance platform which is mounted on the ground milling machine so as to be able to move, in particular, swivel, between a stowage position and a maintenance position, the maintenance platform comprising a floor surface for an operator, from which said operator can carry out maintenance work in the engine compartment when the maintenance platform is in the maintenance position.

The maintenance platform thus constitutes a stand device with a floor surface, which is preferably oriented substantially horizontally in the maintenance position, and on which the operator stands for maintenance purposes and can access the engine compartment. In the maintenance position, the maintenance platform is thus in the position in which it provides the operator with a floor surface for maintenance purposes. In the maintenance position, the maintenance platform is, in particular, arranged outside and spatially directly adjacent to the engine compartment. The operator is thus provided with both a secure floor surface for maintenance purposes outside the engine compartment and simultaneously with easy access to its interior.

Accordingly, the maintenance platform is preferably also implemented in such a manner that it is arranged in its maintenance position adjacent to the engine compartment as seen horizontally. The maintenance platform ideally protrudes laterally from the ground milling machine in the maintenance position and thus provides a suitable floor surface for the operator exclusively for maintenance purposes. Laterally means, as seen in the horizontal direction, that the maintenance platform protrudes from the ground milling machine, in particular, transversely to the forward direction.

It is essential that the maintenance platform is implemented as movable. The maintenance platform is thus specifically movable from the maintenance position to the so-called stowage position and vice versa. The stowage position is characterized by a space-saving accommodation of the maintenance platform on the ground milling machine. In this position, it preferably does not protrude laterally from the ground milling machine, for example. In working operation of the ground milling machine, the maintenance platform is usually in the stowage position in order to have little or no influence on the transport and maneuvering space necessary for the ground milling machine.

According to one embodiment of the present invention, the maintenance platform thus always remains in connection with the ground milling machine and is carried along in a space-saving manner with the ground milling machine especially also in working operation. At the same time, it offers a secure floor surface for the operator outside the engine compartment in the maintenance position of the maintenance platform, from which the operator can carry out maintenance work at the drive engine within the engine compartment. At the same time, provision is made according to one embodiment of the present invention for the maintenance platform to be adjustable together with the cover in such a manner that an adjustment of the maintenance platform to the maintenance position occurs with the adjustment of the cover to the maintenance position, and that an adjustment of the maintenance platform to the stowage position occurs with the adjustment of the cover to the covering position. The maintenance platform and the cover are thus functionally coupled to each other in such a manner that an adjustment of the cover causes an adjustment of the maintenance platform. The essential advantage is that the mere actuation of the cover simultaneously also produces an actuation and adjustment of the maintenance platform at least indirectly. This simplifies the operation of the entirety of the maintenance platform and the cover and allows a preferred embodiment, for example, which only requires a single action by the operator for the adjustment of the maintenance platform and the cover.

The cover as a part of the engine compartment enclosure is further ideally also a part of the machine cladding. The machine cladding designates the outer skin of the ground milling machine. It is frequently implemented as constant and smooth as possible, especially for aesthetic reasons. It is now preferred if the cover is implemented with respect to its exterior side in such a way that it fits into the remaining machine cladding as seamlessly as possible and in a substantially flush manner with respect to the portions of the machine cladding adjoining the cover.

Access to the engine compartment preferably occurs from the side especially in the case of ground milling machines of large configuration, for example, large type road milling machines, stabilizers, recyclers or surface miners. It is thus ideal if the cover is partly a part of a side paneling of the engine compartment enclosure. The side paneling designates the part of the engine compartment enclosure which allows a covering as seen from the engine compartment in the horizontal direction. The cover can be arranged in this case as a swiveling or sliding door.

The maintenance points may lie at positions of the drive engine which are spaced comparatively far apart from each other, especially in the case of large drive engines. It is then frequently required to have access to the engine compartment from several sides. In this case, it is preferable if the cover comprises a side paneling element and a top side paneling element. The top side paneling element designates a part of the engine compartment enclosure which covers the drive engine upwardly in the vertical direction. It is now ideal if the side paneling element and the top side paneling element are jointly adjustable between their covering position and their maintenance position. A suitable adjusting mechanism can be provided for this purpose, for example, which coordinates the movement of the side paneling element with the movement of the top side paneling element. In particular, the side paneling element and the top side paneling element are implemented as a connected modular unit, especially in an integral manner, for example, in form of a component comprising two plate elements, which are connected, in particular, so as to stand perpendicularly on each other, so that an L-shaped overall profile is obtained. The side paneling element and the top side paneling element can be produced and installed together, which reduces the installation work, for example. Furthermore, both elements are moved as an entirety between the maintenance position and the covering position, which facilitates operation.

The specific mounting of the cover and/or the maintenance platform for movement between the covering position and/or the stowage position and the respective maintenance position can be varied in a broad spectrum. In a preferred embodiment, the cover and/or the maintenance platform are mounted on the ground milling machine so as to be able to swivel between the covering position and/or stowage position and the respective maintenance position. For this purpose, the cover and/or the maintenance platform can be mounted on the ground milling machine via a suitable rotatable joint or also a suitable rotary gear. The cover and the maintenance platform may be able to swivel about a common swivel axis. This is especially the case, for example, when the maintenance platform is rigidly connected to the cover and, in particular, is a part of the cover, as will be explained below in closer detail. Alternatively, the cover and the maintenance platform may respectively swivel about a separate swivel axis, the two swivel axes in this case extending, in particular, parallel to each other. If the swivel axes extend parallel to each other, the swiveling direction of the cover and the maintenance platform is oriented in the same direction in a movement between their two end positions (stowage position and covering position to maintenance position and vice versa), which facilitates operation.

As an alternative to the swivel-mounting of the cover and/or the maintenance platform on the ground milling machine, an embodiment is also especially preferred in which the cover and/or the maintenance platform is mounted on the ground milling machine so as to be linearly displaceable, especially horizontally displaceable, between the covering position and/or the stowage position and the respective maintenance position. The cover and/or the maintenance platform are thus displaced in this embodiment along a straight movement axis between their two end positions, comparable to a drawer, for example. This alternative embodiment is usually constructionally more complex, but it is characterized by high operational convenience.

Mixed forms can also generally be considered. For example, the cover may swivel between its covering position and its stowage position and the maintenance platform may be linearly displaceable between its maintenance position and its stowage position and vice versa. The question which specific embodiment variant is the most suitable in the end also depends substantially on the specific configuration of the respective ground milling machine.

According to one embodiment of the present invention, the maintenance platform and the cover are functionally coupled in order to allow for the maintenance platform to be adjustable together with the cover in such a manner that with the adjustment of the cover to the maintenance position there is an adjustment of the maintenance platform to the maintenance position, and/or that with the adjustment of the cover to the covering position there is an adjustment of the maintenance platform to the stowage position. It is ideal in this case if the maintenance platform and the cover can be moved simultaneously. This also facilitates the adjusting process and the specific constructional configuration.

As already mentioned above, the cover as a part of the engine compartment enclosure especially also fulfils a protective function for the drive engine arranged within the engine compartment. It is ideal if the maintenance platform is also protected by the cover against exterior influences. The maintenance platform is, therefore, preferably arranged in the ground milling machine in such a manner that it is at least partly covered in the stowage position to the outside by the cover, which is also situated in the stowage position. In other words, the maintenance platform is overlapped in its stowage position to the outside at least partly and especially completely by the cover. The maintenance platform is stowed for this purpose in its stowage position preferably at the edge of the engine compartment and then lies between the engine compartment and the cover as seen from the interior of the engine compartment.

It is, however, also possible to implement the maintenance platform and the cover in such a way that the maintenance platform per se is a part of the cover and thus part of the engine compartment enclosure with its exterior side. The maintenance platform and the cover thus merge in this preferred refinement into a common component. It is in this case preferable for aesthetic reasons if the floor surface of the maintenance platform forms the inner side of the cover in the stowage position and the bottom side of the maintenance platform opposite of the floor surface then accordingly forms the exterior side of the cover in the stowage position. This refinement of the present invention requires the engine compartment enclosure to be produced from a sufficiently stable material at least in the region of the maintenance platform, which is capable of carrying an operator standing on it.

According to another aspect of the present invention, an optional floor surface is produced by the maintenance platform, on which the operator can stand for maintenance purposes, which can also be stowed away in or on the ground milling machine in a space-saving manner without requiring major reconfiguration work for this purpose. Especially in the case of large machines, in particular, such for ground processing, the engine compartment is arranged at a comparatively high altitude at large distance in the vertical direction from the ground. As already mentioned above, the maintenance platform is in the maintenance position preferably adjacent with one longitudinal side to the engine compartment, so that it is also arranged at a comparatively large distance from the ground. The remaining three sides of the maintenance platform frequently protrude freely from the ground milling machine in the horizontal direction. The maintenance platform according to the present invention allows for obtaining a comfortable maintenance situation for the operator of the machine by the maintenance platform, in particular, for such machines. The configuration of the maintenance platform according to the present invention is thus especially suitable for ground milling machines with a raised drive engine and thus a raised maintenance platform. Raised maintenance platform shall mean especially that the floor surface of the maintenance platform in the maintenance position has a distance from the ground in the vertical direction of >0.5 m, particularly >1 m, and, more particularly, >1.5 m.

In order to prevent an unintentional fall of the operator from the maintenance platform, a railing is preferably provided which protrudes upwardly in a vertical manner from the maintenance platform and thus produces a protection from falling for the user, for example, in the direction away from the ground milling machine. The railing can consist of fixed struts and transverse struts, but also of respective blocking chains, blocking cables, etc., for example. The railing can also be formed additionally or alternatively by a part of the engine compartment enclosure, especially a top side paneling element. It is important that the railing is formed in such a way that it is capable of bearing the standardized loads, carrying the body weight of the operator and preventing a fall.

In a specific embodiment of the railing, provision may further be made for the railing to be fixedly connected to the maintenance platform and/or the cover. In this case, the railing forms a fixed structural unit with the maintenance platform and/or the cover. It may, however, also be preferable, in particular, for reasons of limited space, if the railing is movable and is, in particular, connected to the maintenance platform and/or the cover so it is able to swivel. Provision may, in particular, be made in this case for the railing to be adjustable from a fall-protection position, in which it protrudes upwardly from the maintenance position as compared to the stowage position, to a stowage position, especially a stowage position resting in a flat manner on the floor surface of the maintenance platform. The need for space for stowage of the entirety consisting of the railing and the maintenance platform can thus be reduced considerably.

Especially the swiveling railing has proven to be particularly preferred in the practical implementation for producing a fall protection for a free space between a side wall of the ground milling machine and a vertically upwardly protruding rear wall formed by the cover situated in the maintenance position. This usually comparatively small free space can be secured by a swiveling railing in a space-saving and at the same time reliable manner. The railing is, in particular, arranged in such a way that it reliably secures said free space against inadvertent slippage through said space by the operator. This does not mean, however, that the entire free space needs to be filled completely by the railing.

The maintenance platform situated in the maintenance position and the railing thus preferably form a functional unit which provides a safe foothold for the operator on the one hand and simultaneously prevents a fall of the operator from a great height on the other hand. In summary, the maintenance platform and the railing thus preferably form a maintenance balcony which protrudes towards the side of the ground milling machine, i.e., is situated, in particular, horizontally and protrudes transversely to the working direction and is accessible from the side, and within which the operator can move freely and securely for maintenance purposes. It is further essential that the unit consisting of the maintenance platform and the railing can be stowed on the ground milling machine in such a way that it does not increase, or only insignificantly increases, the exterior dimensions of the ground milling machine. The maintenance balcony is thus stowed in a space-saving manner by means of the aforementioned alternatives in or on the ground milling machine.

As already described above, the present invention comprises both embodiments in which the maintenance platform and the cover form a constructionally mutually fixed and especially also integral unit on the one hand, and embodiments in which the maintenance platform and the cover respectively form separate units on the other hand. For the latter variant, provision is preferably made for the maintenance platform and the cover to be connected to each other functionally coupled via a guide device. The guide device is used for the transfer of motion between the cover and the maintenance platform. It is thus the object of the guide device on the one hand to transmit a movement of the cover onto the maintenance platform in such a manner that the latter is moved along with the former. It is a further object of the guide device that the maintenance platform is moved in relation to the cover in a controlled and coordinated manner. It is possible in this manner to also achieve a simultaneous movement of the maintenance platform by a movement of the cover, which improves the overall operating convenience. As it were, the cover in this case drives the adjusting movement of the maintenance platform, for example. Such a guide device may, for example, comprise a coupling device such as an adjustable connecting strut, a wire rope hoist, a slide rail device or a cogwheel gear between the maintenance platform and the cover, a cylinder-piston unit between the maintenance platform and the cover, and/or a pin guided in a slideway between the cover and the maintenance platform. In summary, the guide device can also be provided with more complex gears such as steering gears, traction drive gears, wheel gears, etc., via which the movement sequences between the cover the maintenance platform can be coordinated. Electronic coupling via a control unit, which drives electrical and/or hydraulic and/or mechanical actuators, for example, for the drive of the maintenance platform and the cover in a coordinated manner, may also be used.

Manual operation of the adjusting movement of the maintenance platform and the cover between the respective end positions (maintenance position and stowage or covering position) is usually provided and sufficient. In particular, the cover and the engine compartment enclosure frequently consist of plastic materials which are comparatively easy to move. Depending on the size of the maintenance platform and/or the cover or their entirety, it may, however, be preferable if the adjusting movement of the maintenance platform and/or the cover is driven between the end positions by a drive device. The adjusting process is thereby automated, so that the operator no longer needs to act manually in this case. Suitable drives can be appropriate hydraulic devices or electric motors, etc.

In order to further increase the operating safety, provision is made in a preferred refinement of the present invention for the ground milling machine to comprise a latching device, which is implemented such that it fixes the maintenance platform and/or the cover in the maintenance position. Only when the latching device has latched accordingly and thus fixes the cover and/or the maintenance platform in the maintenance position, can the operator assume that the maintenance platform and/or the cover has accordingly reached its end position. Such a latching device can be a spring-loaded securing hook, a latching bolt or the like. It is obviously also possible to provide such a latching device for the maintenance platform and/or the cover in the stowage position or covering position.

Depending on the size of the ground milling machine it may further be appropriate to provide multiple maintenance platforms on the ground milling machine. Two maintenance platforms are preferable, for example, which are arranged opposite each other on the longitudinal sides in order to allow access to the drive engine in the engine compartment from two opposite sides. They may be arranged at the same height or also with an offset relative to each other on the ground milling machine. It is also possible to arrange multiple maintenance platforms adjacent to each other or corner to corner, in particular, in such a manner that the operator can step from one maintenance platform directly to the other maintenance platform. This can be advantageous in that multiple relatively small maintenance platforms can be easier to mount and operate than a very large maintenance platform.

The underlying principle of the present invention can be applied to a large number of, in particular, self-propelled, ground milling machines, the advantages of the present invention becoming apparent particularly in road milling machines, more particularly, large type milling machines, stabilizers, recyclers or surface miners. A common feature of ground milling machines is a milling drum as a working device, which is a hollow-cylindrical support tube with milling chisel devices provided on the outside jacket surface. It rotates in working operation horizontally and transversely to the working direction, engages in the subgrade soil and thereby mills subgrade soil material. Such ground milling machines comprise an operator platform from which the ground milling machine is controlled. The milling drum is usually arranged on a machine frame. A so-called large milling machine is usually a road milling machine, especially a cold milling machine, having a milling width of 1.50 m or more. Such large milling machines are frequently arranged, in particular, as so-called center rotor milling machines, in which the milling drum is arranged in the working direction substantially centrally with respect to the length of the machine, and is not arranged in the rear region, for example. The operator platform is frequently also arranged centrally above the milling drum in these large milling machines. It is especially in such machines that, as a result of the design, the drive motor and thus the engine compartment are situated at a comparatively large vertical distance from the subgrade soil. Maintenance work in the engine compartment is, therefore, frequently difficult in these machines, in particular, so that the advantages of the present invention are particularly apparent in such cases.

In a specific implementation of the present invention in such a ground milling machine, the maintenance platform and the cover are preferably articulated to the machine frame of the ground milling machine. The machine frame is obviously arranged in a sufficiently massive and stable manner, so that it especially also securely carries the maintenance platform with the operator standing thereon.

Ground milling machines frequently comprise an operator platform which extends laterally to the two exterior sides of the ground milling machine. This allows the user to see both sides of the ground milling machine in transport and working operation. In order to reach the maintenance platform which is especially arranged on one side of the ground milling machine, a transfer plate which protrudes horizontally and laterally transversely to the working direction is preferably provided, via which the operator reaches the maintenance platform situated in the maintenance position coming from the operator platform. The transfer plate thus preferably protrudes parallel to the maintenance platform situated in the maintenance position. The transfer plate is especially arranged at the level of a supporting member of a protective roof of the operator platform and provides the user with the possibility to securely pass the exterior side of the ground milling machine at the level of said member to the maintenance platform. The transfer plate is ideally also adjustably mounted on the machine frame and can be swiveled in towards the machine or pushed into the machine for stowage purposes, for example. This embodiment generally provides the operator with a possibility to use the already existing step device to the operator platform and to subsequently reach the maintenance platform situated at a comparatively high level from there. A separate climbing aid to the maintenance platform can thus be omitted.

In order to ensure that the operator can securely reach the maintenance platform situated in the maintenance position from the operator platform, it is preferable if the maintenance platform is arranged on the ground milling machine in such a manner that it is situated in the maintenance position in the vertical direction substantially at the level of the treading surface of the operator platform. The floor surface of the maintenance platform in the maintenance position and the floor or treading surface of the operator platform thus have the same vertical distance from the subgrade soil. This reduces the risk of tripping during transfer between the maintenance platform and the operator platform. Ideally, the transfer plate is also additionally arranged in such a manner that its treading surface is also situated at this height.

The maintenance platform is preferably arranged in the working direction of the ground milling machine behind the operator platform and, in particular, as seen in the working direction, directly adjoining it. As a result, the operator reaches the maintenance platform quickly and directly from the operator platform. Furthermore, the drive engine in the ground milling machines mentioned above is frequently arranged in the rear region, but may sometimes also be arranged in the front region, of the ground milling machine. The maintenance platform and the cover are arranged on one side of the machine, i.e., on a right and/or left side of the ground milling machine in relation to the working direction because a plurality of maintenance points can be reached better from the side than from the operator platform or from the rear region, for example.

It has proven to be particularly suitable in practice, especially in the case of road milling machines, particularly large type milling machines, stabilizers, recyclers or surface miners, if the operator platform comprises a roof which is adjustable and can, in particular, be swiveled between a working position and a transport position. The roof can preferably swivel forwardly in the working direction from the working position to the transport position, i.e., ideally facing away from the cover and the maintenance platform. This ensures that the roof situated in the transport position does not block the opening path of the maintenance platform and/or the cover. Access to the engine compartment by adjustment of the cover and the maintenance platform to the respective maintenance position can thus be ensured especially even when the roof is situated in the transport position.

BRIEF DESCRIPTION OF THE DRAWINGS

The present invention will be explained below in closer detail by reference to the exemplary embodiment shown in the figures. In the schematic figures:

FIG. 3a shows a perspective oblique view of a part of the road milling machine with cover and maintenance platform situated in an intermediate position;

FIG. 3b shows an enlarged detail view of section A of FIG. 3a;

FIG. 4a shows a road milling machine with the cover situated in the covering position and the maintenance platform situated in the stowage position;

FIG. 4b shows a partial view of the maintenance platform and the cover of FIG. 4a;

FIG. 5a shows a partial sectional view of the road milling machine of the preceding figures along the line of intersection I-I of FIG. 1a, with the cover and the maintenance platform situated in the maintenance position;

FIG. 5b shows a partial sectional view of FIG. 5a with the maintenance platform situated in the stowage position and the cover situated in the covering position;

Like components are designated in the figures by like reference numerals, however, not every component repeated in the drawings is necessarily designated individually in each figure.

DETAILED DESCRIPTION OF THE INVENTION

Figure 1A:
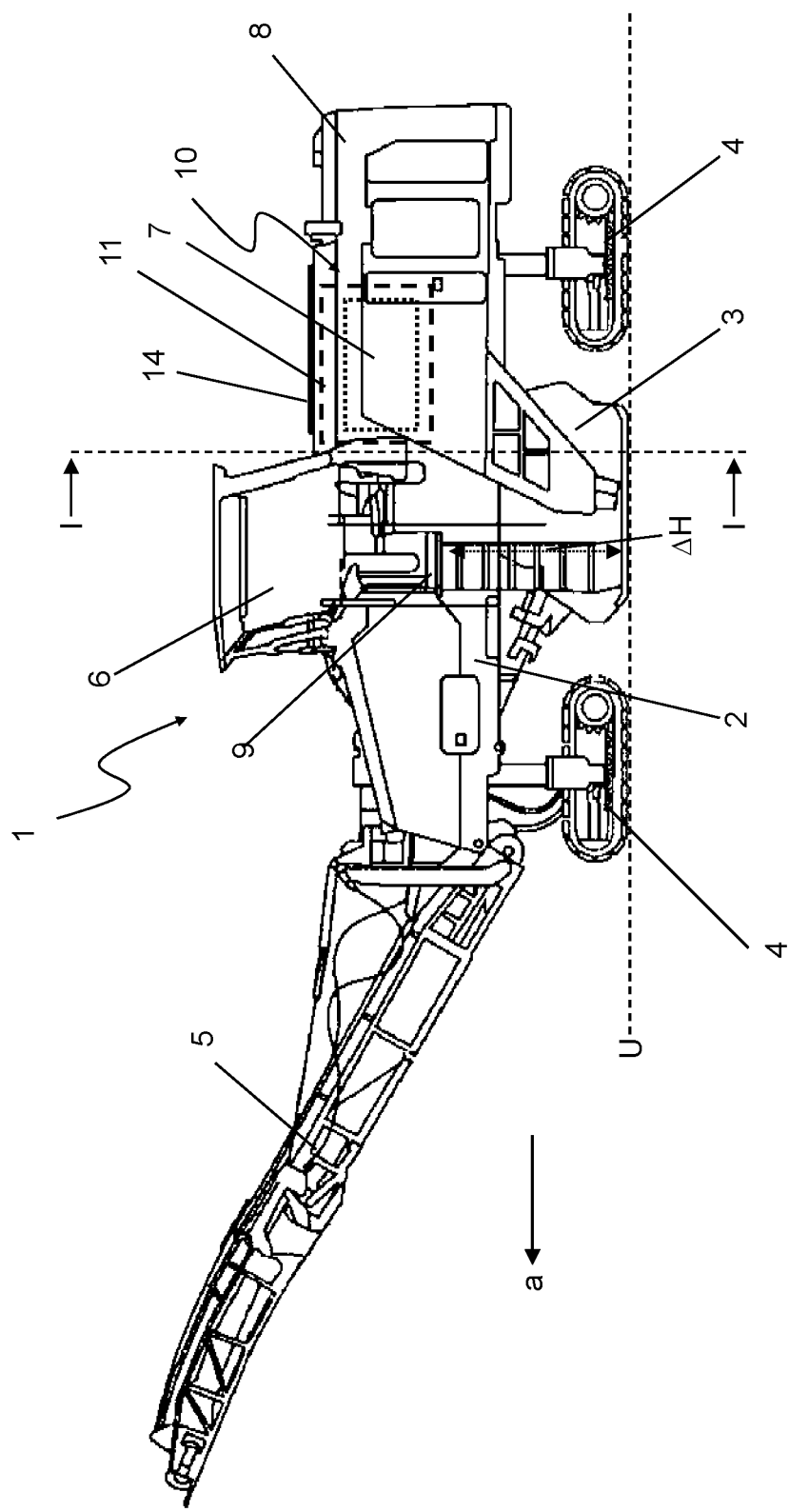
FIG. 1a shows a side view of a ground milling machine of the road milling machine type, specifically a large type milling machine.

FIG. 1a shows a generic ground milling machine 1 in a side view. The ground milling machine specifically concerns a road milling machine of the road cold milling machine type and of the category of large milling machines. Reference is made below with respect to FIGS. 2a to 5b to this road milling machine 1 in lieu of generic ground milling machines, the implementation of the maintenance platform within the scope of the present invention also being applicable, in particular, for the stabilizer/recycler of FIG. 1b and the surface miner of FIG. 1c.

Figure 1B:
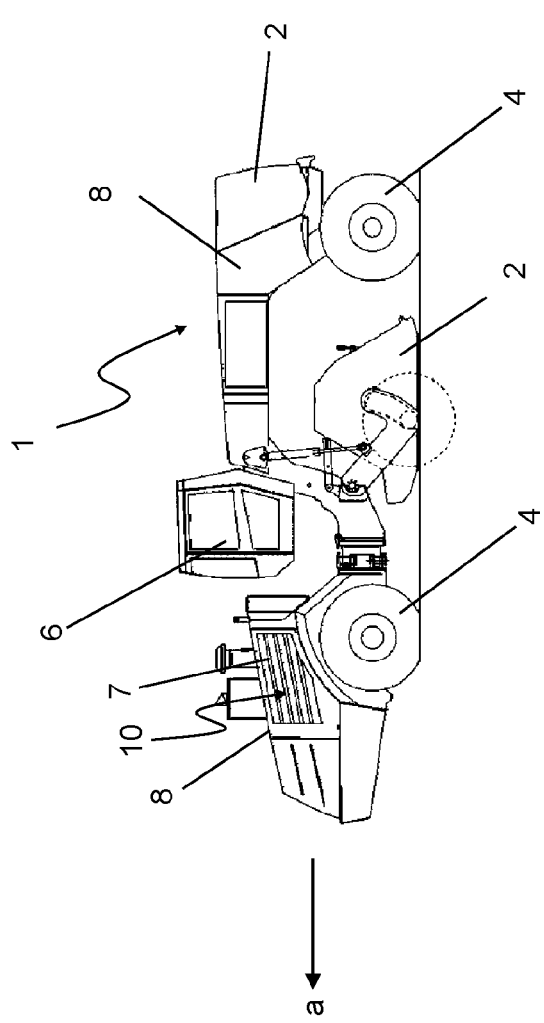
FIG. 1b shows a side view of a ground milling machine of the stabilizer/recycler type.
Figure 1C:
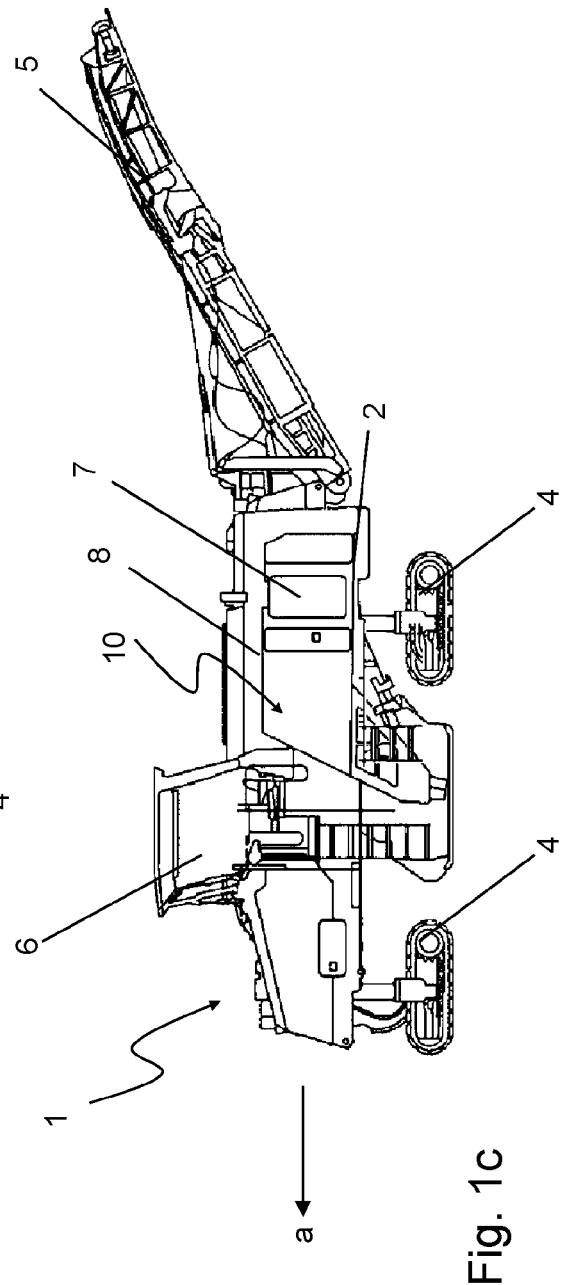
FIG. 1c shows a side view of a ground milling machine of the surface miner type.

Essential elements of the ground milling machines 1 of FIGS. 1a, 1b and 1c are a machine frame 2, a milling drum (not shown in FIG. 1) in a milling drum box 3, traveling devices 4, a conveyor belt 5 (not with the stabilizer/recycler in FIG. 1b), an operator platform 6, a drive engine 7 and a machine cladding 8. In working operation, the ground milling machine 1 travels in the working direction a over the subgrade soil U and mills the subgrade soil material in the known manner by means of a milling drum rotating about an axis of rotation extending horizontally and transversely to the working direction a. Operator control is carried out from the operator platform 6, whose horizontal floor surface is spaced by the distance ΔH in the vertical direction from the subgrade soil U. FIGS. 1a to 1c illustrate that the operator platform and especially also its floor surface 9 is situated at a comparatively high altitude above the subgrade soil as a result of the respective largely dimensioned configuration of the ground milling machine 1, especially at a height of more than 1 m and especially more than 1.50 m. Such ground milling machines 1 are subject to heavy loads in working operation and, therefore, require continuous and comparatively intensive maintenance. Especially intensive maintenance points are, in particular, the milling device per se and the drive engine 7, which supplies the drive power required for the traveling operation and the drive of the milling device. As a result of the design, the drive engine 7 is also situated at a comparatively high level and cannot be reached for maintenance work, in particular, from the subgrade soil. The ground milling machine 1 comprises a stand device 10 for maintaining the drive engine 7, in particular, whose configuration and functionality is described in closer detail with reference to the figures below. The essential aspect is that the stand device 10 is implemented as integrated in the ground milling machine 1 and is thus permanently carried along by the ground milling machine 1. Further details of the stand device 10 will be explained below with exemplary reference to the road milling machine 1 of FIG. 1a but also apply to the further ground milling machines of FIGS. 1b and 1c.

Figures 2A, 2B:
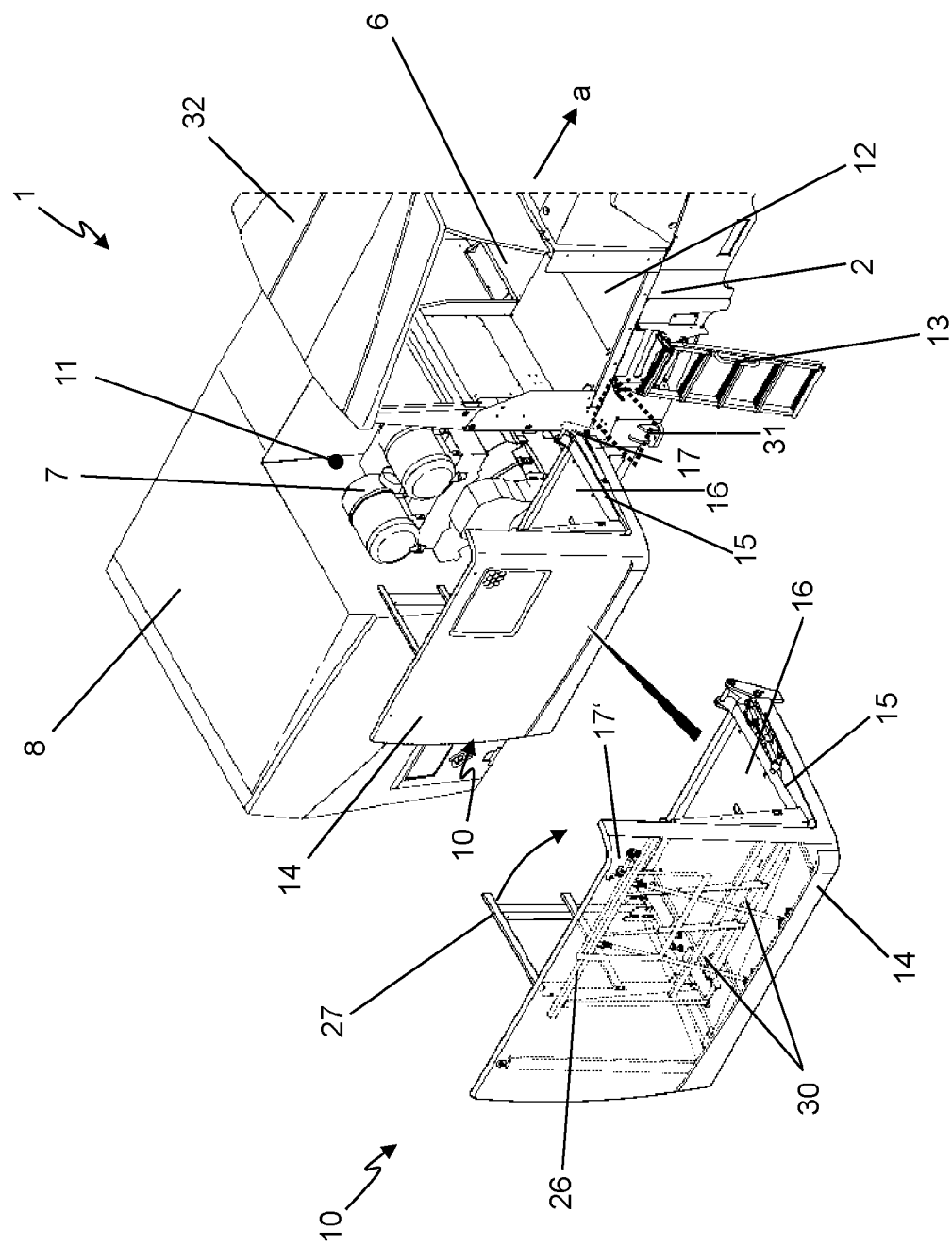
FIG. 2a shows a perspective oblique view of a part of the road milling machine of FIG. 1a with maintenance platform and cover situated in the maintenance position.
FIG. 2b shows a modular unit consisting of the maintenance platform and cover of FIG. 2a in a perspective oblique view.
Figures 4A, 4B:
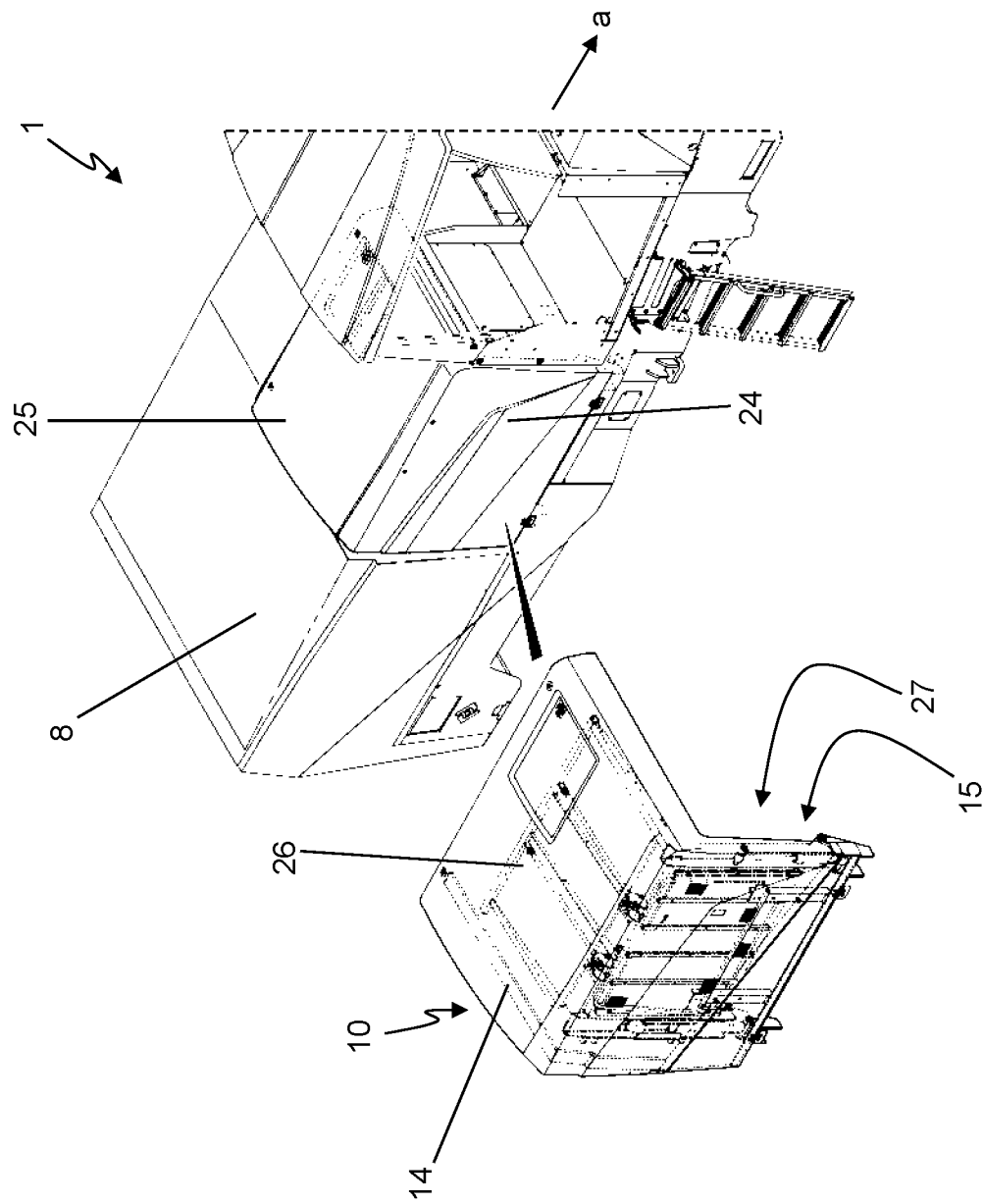

FIG. 2a shows a perspective oblique view of the road milling machine 1 of FIG. 1 in an oblique view from the front on the right. The traveling devices 4, the conveyor belt 5 and the milling drum box 3 of FIG. 1 are not shown merely for reasons of clarity of the illustration. The drive engine 7 is arranged in an engine compartment 11 situated behind the operator platform 6 in the working direction a. The engine compartment 11 is thus an arrangement compartment within the road milling machine 1 for housing the drive engine 7. The engine compartment 11 lies in the vertical direction substantially at the height of a floor surface 12 of the operator platform 6. As is normal for generic self-propelled ground milling machines, the road milling machine 1 comprises a machine cladding 8 which forms the outside surface of the road milling machine 1. A part of the machine cladding 8 which covers the engine compartment 11 to the outside is arranged as an adjustable cover 14. This part of the machine cladding 8 can thus be adjusted between an extended maintenance position, as shown in FIG. 2a, and a retracted covering position, as shown in FIG. 4a, and vice versa. In the covering position according to FIG. 4a, the cover 14 is integrated with its exterior side in the machine cladding 8 and covers a part of the engine compartment 11 to the outside. Specifically, in particular, a side paneling element 24 (FIG. 4a) converges in a virtually flush manner with its outside surface into the adjacent machine cladding parts and thus offers the impression of a substantially continuous uniform overall surface. In the specific exemplary embodiment, the cover 14 is for this purpose mounted by means of a swivel joint on the machine frame 2 of the road milling machine in a manner which will be explained below in closer detail.

The stand device 10 further comprises a maintenance platform 15 with a floor surface 16. The maintenance platform is also movably mounted on the machine frame 2, specifically between a maintenance position indicated in FIG. 2a and a stowage position indicated in FIG. 4a. In the maintenance position, the maintenance platform 15 is mounted on the road milling machine 1 in such a way that an operator is granted access to the drive engine 7 in the engine compartment 11 when standing thereon. Specifically, the maintenance platform 15 is arranged in the present exemplary embodiment in such a way that in the present case it quasi directly adjoins the engine compartment 11 horizontally thereto and transversely to the working direction a. The operator standing on the floor surface 16 of the maintenance platform 15 thus stands directly adjacent to the engine compartment 11 and can thus optimally reach maintenance points at the drive engine 7. The comparatively high position of the drive engine 7 is irrelevant here since the maintenance platform 15 is arranged at the level of the engine compartment 11. The stand device 10 with the maintenance platform 15 is further arranged, as seen in the working direction a, in the region between the milling drum and the rear running gear of the road milling machine.

In the specific exemplary embodiment of the stand device 10, the cover 14 and the maintenance platform 15 are respectively arranged as independent components, which are functionally coupled to each other in the manner described below in closer detail. However, embodiments in which the cover 14 and the maintenance platform 15 are one and the same component are expressly also comprised in the scope of the present invention. The stand device 10 is then arranged as a substantially flat element whose inner side facing the engine compartment 11 forms the floor surface 16 of the maintenance platform 15 and whose exterior side constitutes the outer surface of the cover 14.

The stand device 10 is mounted in the present case by means of a swivel joint on the machine frame 2 of the road milling machine 1, so that the stand device 10 can be moved from the swiveled-out position shown in FIG. 2a via the intermediate position shown in FIG. 3a to the swiveled-in position represented in FIG. 4a. Details on the swivel mounting are shown, in particular, in the enlarged detail view of the joint region A of FIG. 3a, which is shown in FIG. 3b. The joint device 17 comprises bearing tabs 18 which are rigidly connected to the machine frame and are spaced from each other to form a type of bearing fork. In a swivel joint manner, the cover 14 is connected to the bearing tabs 18 via a joint pin 19 and the maintenance platform 15 is connected to the bearing tabs 18 via a joint pin 20. This results in a swivel axis 21 for the cover 14 and a swivel axis 22 for the maintenance platform 15. The pivot axes 21 and 22 extend parallel with respect to each other. A respective joint device 17 is further provided on the side (against the working direction a) which is opposite the joint device 17 and is indicated in FIG. 2b on the side of the stand device 10 with reference numeral 17'.

A hydraulic cylinder 23 for driving the swiveling movement is further arranged between the joint pin 19 and an articulation 24 on the maintenance platform 15, via which the swiveling movement is driven between FIGS. 2a to 4a.

Further details on the basic configuration of the stand device 10 are especially also shown in FIGS. 5a and 5b. FIG. 5a shows the stand device 10 in the swiveled-out state and FIG. 5a in the swiveled-in state in a sectional view along the line I-I of FIG. 1, i.e., in a cross-section situated in the driving direction a behind the operator platform vertically and transversely to the working direction a. The illustration merely shows the right side of the machine (left in the rearward facing view), as indicated by the dashed lines extending to the right. FIG. 5a shows the cover 14 in its maintenance position, as is also the maintenance platform 15. FIG. 5b on the other hand shows the maintenance platform 15 swiveled-in towards the road milling machine 1 in a space-saving manner in its stowage position, as well as the cover 14, which is also swiveled-in towards the road milling machine 1 in a space-saving manner in its covering position, covering the maintenance platform 15 to the outside.

Figure 6:
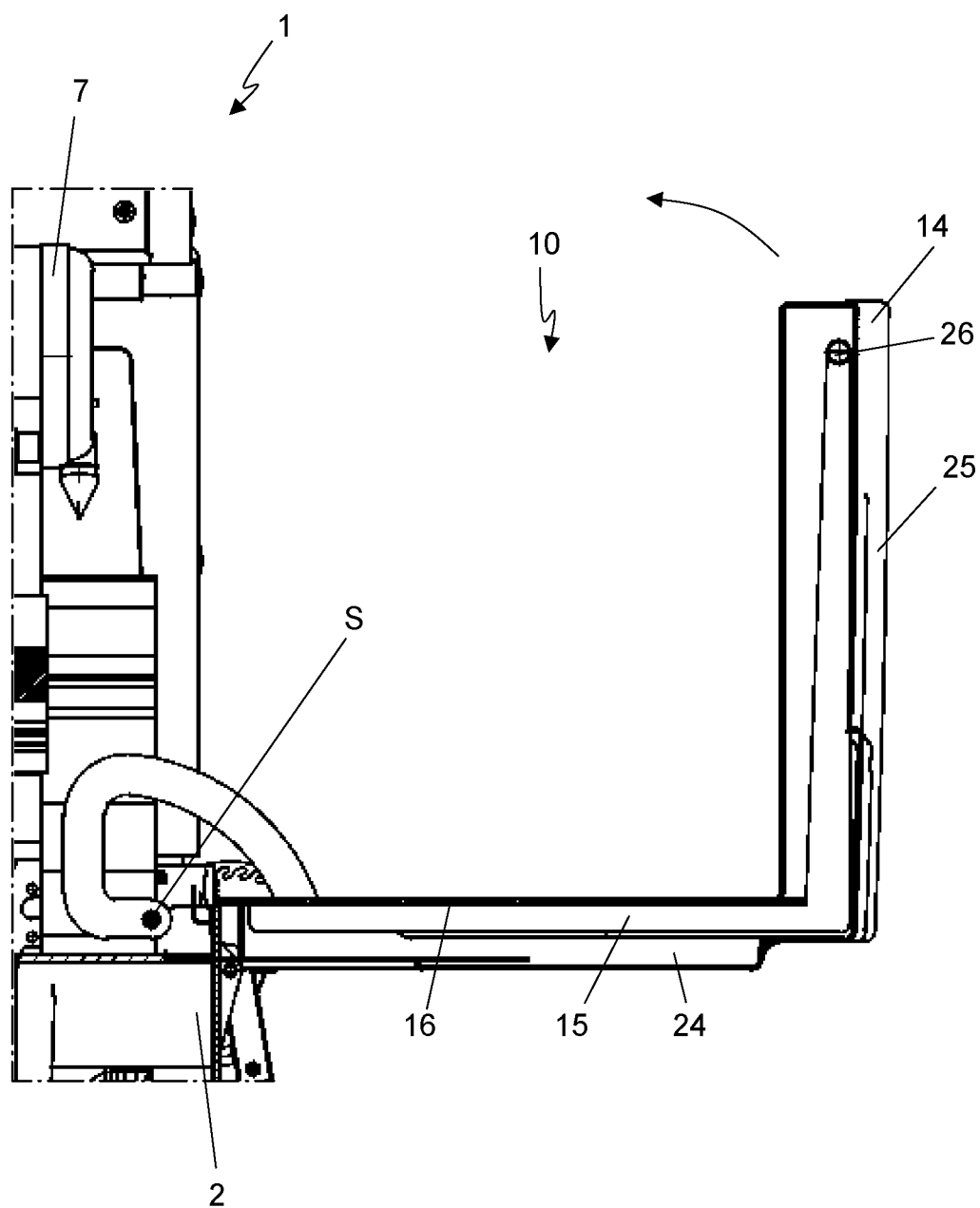
FIG. 6 shows a partial sectional view of the road milling machine of FIG. 1a with the cover and the maintenance platform swiveled about a common swivel axis in the maintenance position.

As shown in the embodiment of FIG. 6, the cover 14 and the maintenance platform 15 may be able to swivel about a common swivel axis (S). This is especially the case, for example, when the maintenance platform 15 is rigidly connected to the cover 14.

Figure 7:
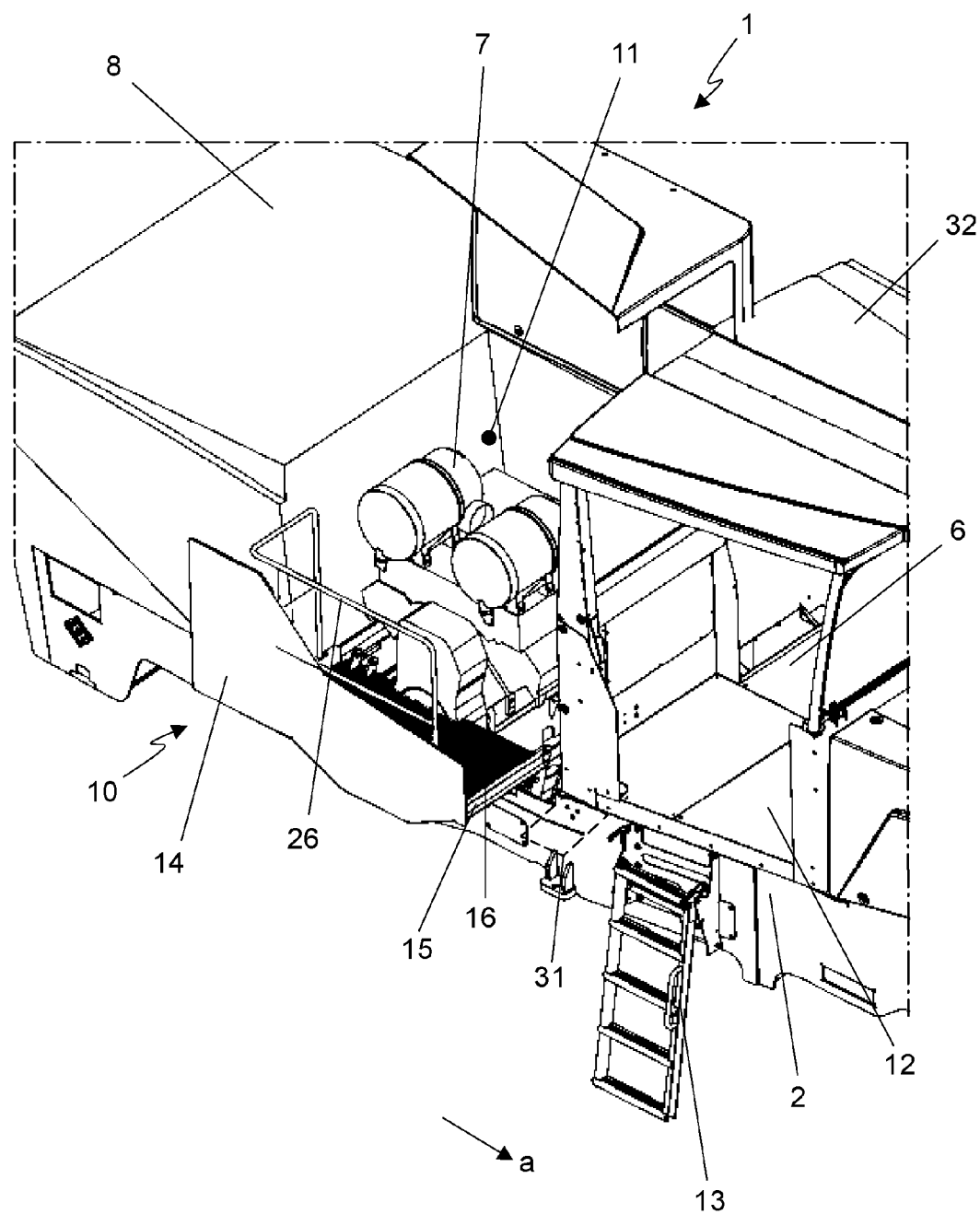
FIG. 7 shows a partial sectional view of the road milling machine of FIG. 1a with the maintenance platform linearly displaced in the maintenance position.
Figure 8:
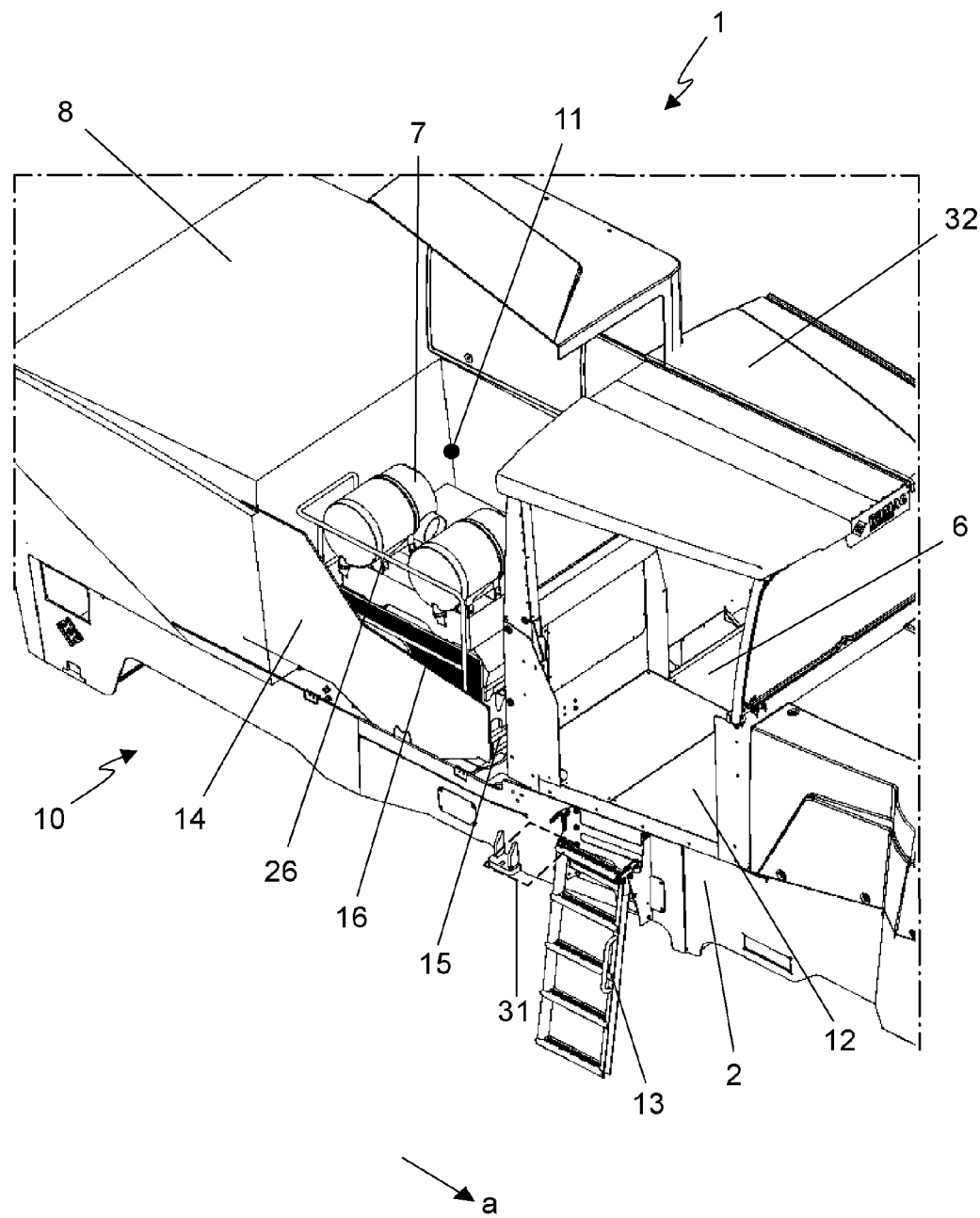
FIG. 8 shows a partial sectional view of FIG. 7 with the maintenance platform situated in the stowage position.

As an alternative to the swivel-mounting of the cover 14 and/or the maintenance platform 15 on the ground milling machine 1, an embodiment is shown in FIGS. 7 and 8 in which the cover 14 and/or the maintenance platform 15 is mounted on the ground milling machine 1 so as to be linearly displaceable, especially horizontally displaceable, between the covering position and/or the stowage position and the respective maintenance position. The cover 14 and/or the maintenance platform 15 are thus displaced in this embodiment along a straight movement axis between their two end positions, comparable to a drawer, for example, as shown in FIGS. 7 and 8.

The cover 14 is formed in its entirety as a substantially rectangular element, comprising a side paneling element 24 and a top side paneling element 25. The side paneling element 24 and the top side paneling element 25 form the machine cladding 8 with their exterior side part, the top side body paneling element 25 covering the engine compartment 11 upwardly in the vertical direction in the covering position of the cover 14, and the side paneling element 24 sealing the engine compartment 11 to the side as seen in the horizontal direction at an essentially right angle thereto. The cover 14 thus forms in its entirety a bonnet which can be moved between the two aforementioned positions.

A further essential element of the stand device 10 is the maintenance platform 15, which is also a plate-shaped element which comprises the floor surface 16 on its upper side. In the maintenance position according to FIG. 5a, the maintenance platform is horizontally swiveled away in a manner protruding from the outside of the road milling machine and thus offers a floor surface to the operator at the level of the machine frame 2 or the engine compartment 11, from which the operator has access to the drive engine 7 in the engine compartment 11. The floor surface 16 of the maintenance platform 15 extends almost parallel to the outside surface of the side paneling element 24. In the stowage position according to FIG. 5b, the maintenance platform 15 rests with its floor surface 16 upright in the vertical direction parallel to the engine compartment 11. In this position, the maintenance platform 15 with its stand plate thus requires very little space and especially does not lead to any broadening of the machine in the horizontal plane transversely to the working direction a.

The maintenance platform 15 further comprises a railing 26 for safety purposes, which railing secures the maintenance platform 15 on the side opposite the engine compartment 11 in the maintenance position. The railing 26 protrudes upwardly from the maintenance platform 15 in the vertical direction, up to approximately the height of the hip of an operator of average height. Said rearward railing is rigidly connected to the maintenance platform 15 and also forms a rectangular unit which is arranged in a complementary manner to the arrangement of the cover 14. In the stowage position, said railing is situated beneath the top side paneling element 25 of the cover 14 above the drive engine 7. The maintenance platform 15 further comprises a swiveling railing 27, which in the erected position according to FIG. 5 provides security from falling against the working direction for the operator standing on the maintenance platform 15. The swiveling railing 27 can be swiveled in from the upright position shown in FIG. 5a towards the floor surface 16 and can thus also be stowed away in a space-saving manner. Swivel joints 28 are provided for this purpose, whose swivel axes 29 extend perpendicularly to the swivel axes 21 and 22, as seen in the horizontal plane.

The maintenance platform 15 and the cover 14 are functionally coupled to each other via coupling rods 30 and 20, which in the specific exemplary embodiment connect a head region of the railing 26 situated at the top in the vertical direction to the cover 14 in the connecting region of the side paneling element 24 with the top side paneling element 25. Overall, a swivel gear is thus realized, which is driven by the hydraulic cylinder 23. The actuating movement exerted by the hydraulic cylinder 23 onto the maintenance platform 15 is transmitted accordingly via the coupling rods 30 to the cover 14, so that it follows the actuating movement of the maintenance platform. A comparison of FIGS. 5a and 5b shows that when the hydraulic cylinder 23 is extended the stand device 10 is swiveled inwardly in its entirety towards the road milling machine, and is accordingly swiveled outwardly when the hydraulic cylinder is retracted. This basic configuration is further illustrated by the detail view according to FIG. 2b, in which the cover 14 is shown in a partly transparent manner.

The practical application of the stand device 10 will be explained below in closer detail. The stand device 10 is swiveled inwardly towards the road milling machine 1 in a space-saving manner in working and driving operation, as shown in FIGS. 4a and 5b. The maintenance platform 15 and the cover 14 are in the stowage or covering position. The stand device 10 is thus integrated in a space-saving manner in the entirety of the machine, although it is carried along permanently by the road milling machine 1. The outer dimensions of the road milling machine 1 are not increased relevantly by the stand device 10 in this position. The engine compartment 11 is partly covered to the outside by the cover 14. If maintenance work is to be carried out, the operator swivels the stand device 10 via the intermediate position shown in FIG. 3a to the maintenance position according to FIGS. 2a and 5a. The stand device 10 then forms a unit which is arranged in the manner of a balcony on the road milling machine 1, which can be accessed by the operator from the operator platform 6. A transfer plate 31 can be provided for this purpose especially for overcoming the free space between the operator platform 6 and the floor surface 16 of the maintenance platform 15, which transfer plate is indicated in FIG. 2a and can be pulled or swiveled out for this purpose, for example. In this position, the stand device 10 laterally protrudes with the distance ΔA (FIG. 5a) as seen in the horizontal direction and transversely to the working direction a from the side paneling of the road milling machine 1. The operator can then conveniently service the drive engine 7 in the engine compartment 11 from the maintenance platform 15 situated in the maintenance position without requiring the operator to move within the engine compartment 11 via respective floor surfaces. The floor surface 16 of the maintenance platform 15, the transfer plate 31 and the floor surface 12 of the operator platform 6 then preferably lie in a common horizontal plane. The ascent to the operator platform 6 occurs via a ladder 13 from which the operator can also directly reach the stand device 10.

Figure 9:
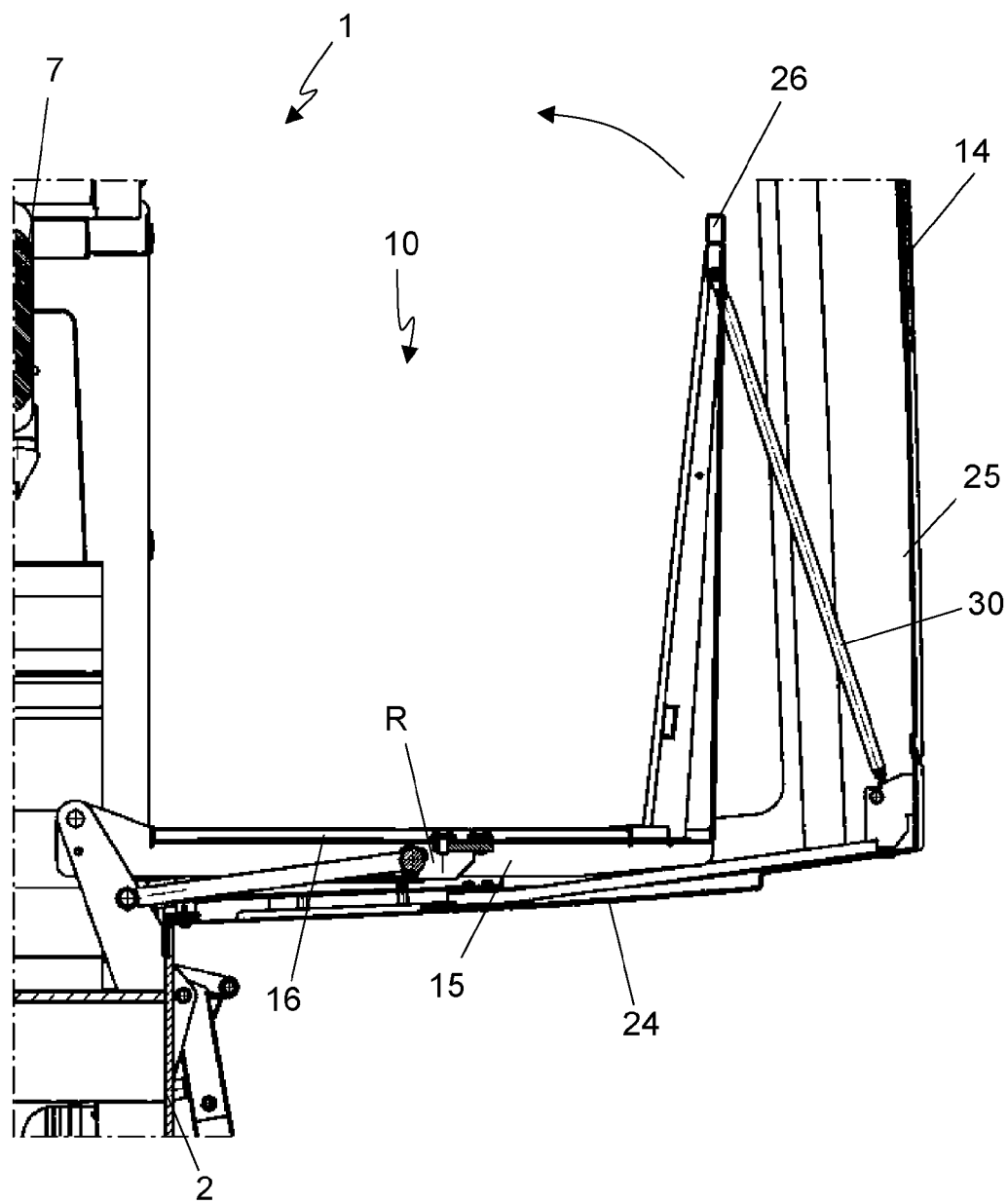
FIG. 9 shows a partial sectional view of the road milling machine of FIG. 6 with the cover and the maintenance platform latched in the maintenance position.

In order to further increase the operating safety, provision is made in one embodiment of the present invention as shown in FIG. 9 for the ground milling machine 1 to comprise a latching device (R), which is implemented such that it fixes the maintenance platform 15 and/or the cover 14 in the maintenance position. Only when the latching device (R) has latched accordingly and thus fixes the cover 14 and/or the maintenance platform 15 in the maintenance position, can the operator assume that the maintenance platform 15 and/or the cover 14 has accordingly reached its end position. Such a latching device (R) can be a spring-loaded securing hook, a latching bolt or the like. It is obviously also possible to provide such a latching device (R) for the maintenance platform 15 and/or the cover 14 in the stowage position or covering position.

Provision may further be made in a refinement of the exemplary embodiment for a respective stand device 10 to be provided on both sides of the road milling machine 1, so that the engine compartment is accessible from the two mutually opposite longitudinal sides of the road milling machine. In particular, these two stand devices can be arranged in a mirror-inverted manner, but otherwise identical to each other. In addition, or alternatively, a stand device 10 according to the aforementioned principle can also be provided in the rear region of the road milling machine 1.

Figure 10:
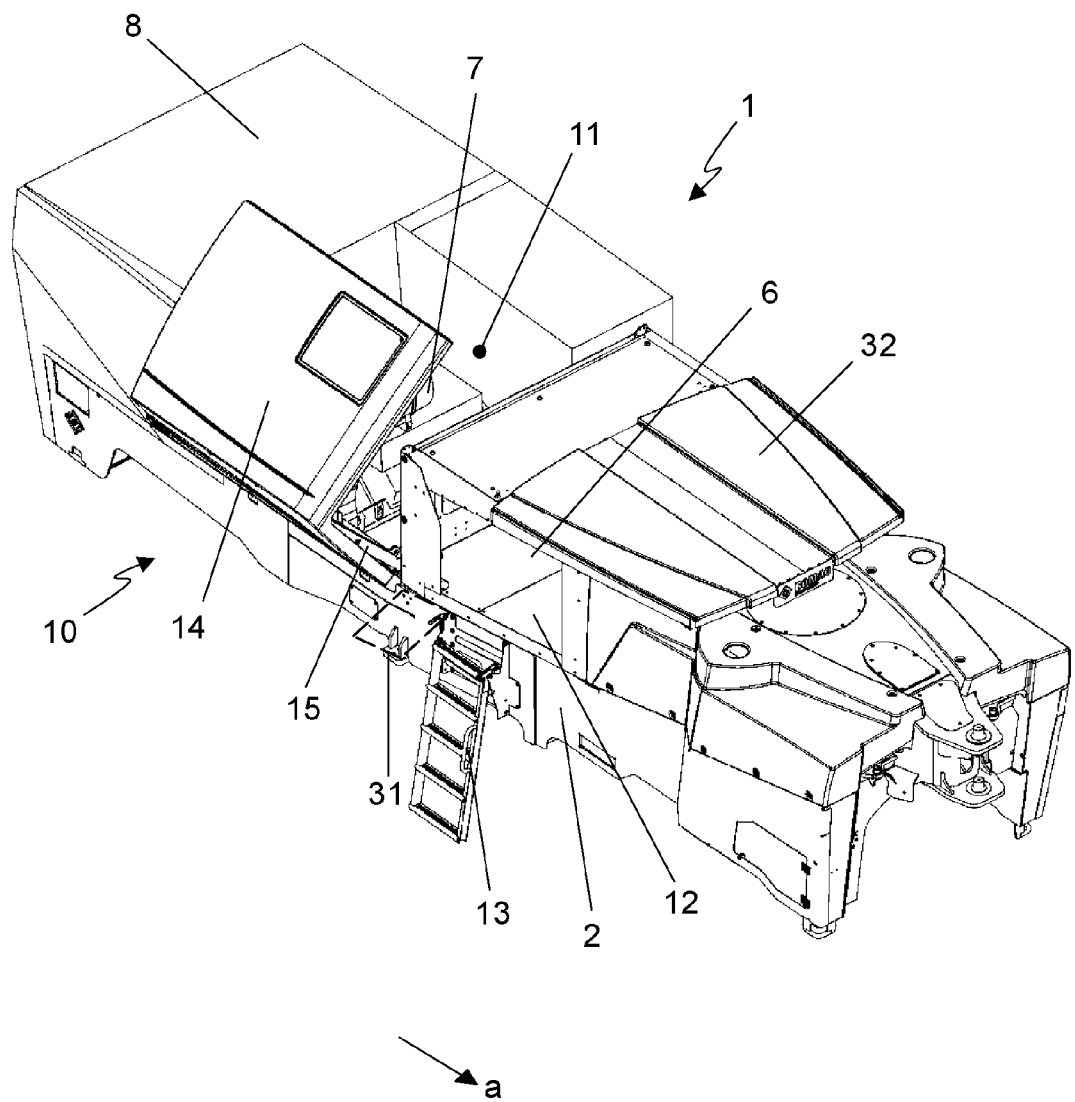
FIG. 10 shows a perspective oblique view of part of the road milling machine with the roof swiveled to the transport position.

Furthermore, the roof 32 of the road milling machine 1 is adjustable in the present embodiment between an upright working position (according to FIG. 2a, for example) and a swiveled-in transport position (according to FIG. 10, for example). The roof 32 can preferably swivel forwardly in the working direction from the working position to the transport position, i.e., ideally facing away from the cover 14 and the maintenance platform 15. This ensures that the roof 32 situated in the transport position does not block the opening path of the maintenance platform 15 and/or the cover 14. Access to the engine compartment 11 by adjustment of the cover 14 and the maintenance platform 15 to the respective maintenance position can thus be ensured especially even when the roof 32 is situated in the transport position. The roof 32 is attached for this purpose by way of swivel joints in the known manner on respective retainers and can be swiveled downwardly and to the front in the working direction a to a stowage position. The swiveling adjustment of the roof 32 thus occurs away from the stand device 10 in the working direction a. This leads to the consequence that the swiveled-in roof 32 does not rest on the cover 14, so that it can be opened irrespective of whether the roof 32 is in the working position or in the stowage position.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:
1. A self-propelled ground milling machine, comprising:
   a drive engine arranged in an engine compartment and an engine compartment enclosure which covers the engine compartment at least partly on sides and to a top of the engine compartment, at least a part of the engine compartment enclosure being a cover which is adjustable between a covering position and a maintenance position,
   wherein a movable maintenance platform is provided, which is mounted on the ground milling machine so as to move between a stowage position and a maintenance position, the maintenance platform comprising a floor surface for an operator from which said operator can carry out maintenance work in the engine compartment, a railing providing fall protection for a free space between a side wall of the ground milling machine and a rear wall formed by the cover situated in the maintenance position and a laterally protruding transfer plate via which the operator reaches the maintenance platform situated in the maintenance position from an operator platform of the ground milling machine, and the maintenance platform being adjustable together with the cover in such a manner that an adjustment of the maintenance platform to the maintenance position occurs with the adjustment of the cover to the maintenance position, and an adjustment of the maintenance platform to the stowage position occurs with the adjustment of the cover to the covering position.

2. The self-propelled ground milling machine according to claim 1,
   wherein the cover forms at least partially a part of a side paneling of the engine compartment enclosure.

3. The self-propelled ground milling machine according to claim 1,
   wherein the cover comprises a side paneling element and a top side paneling element, with the top side paneling element covering the engine compartment upwardly in the vertical direction in the covering position of the cover.

4. The self-propelled ground milling machine according to claim 1,
   wherein the cover and/or the maintenance platform are mounted on the ground milling machine so as to be able to swivel between the covering position and/or the stowage position and the respective maintenance position.

5. The self-propelled ground milling machine according to claim 1,
   wherein the cover and the maintenance platform can swivel about a common swivel axis.

6. The self-propelled ground milling machine according to claim 1, wherein the cover and the maintenance platform can respectively swivel about a separate swivel axis, the two swivel axes extending parallel to each other.

7. The self-propelled ground milling machine according to claim 1,
wherein the cover and/or the maintenance platform are mounted on the ground milling machine so as to be linearly displaceable between the covering position and/or the stowage position and the respective maintenance position.

8. The self-propelled ground milling machine according to claim 1,
wherein the maintenance platform is covered at least partly to the outside in the stowage position by the cover situated in the stowage position.

9. The self-propelled ground milling machine according to claim 1,
wherein the railing protrudes in an upright manner essentially perpendicularly from said maintenance platform.

10. The self-propelled ground milling machine according to claim 9,
wherein the railing is fixedly connected to the maintenance platform.

11. The self-propelled ground milling machine according to claim 9,
wherein the railing is connected to the maintenance platform so as to be able to swivel from an upright fall protection position to a stowage position resting flat on the floor surface of the maintenance platform.

12. The self-propelled ground milling machine according to claim 11,
wherein the swiveling railing provides fall protection for a free space between a side wall of the ground milling machine and a rear wall formed by the cover situated in the maintenance position.

13. The self-propelled ground milling machine according to claim 9,
wherein the maintenance platform and the railing form a maintenance balcony which protrudes to the side of the ground milling machine and is accessible from the side in the maintenance position.

14. The self-propelled ground milling machine according to claim 1,
wherein the maintenance platform and the cover are connected to each other via a guide device which provides a transfer of motion between the cover and the maintenance platform.

15. The self-propelled ground milling machine according to claim 14,
wherein the guide device is an adjustable connecting strut, a cylinder-piston unit or a pin guided in a slideway.

16. The self-propelled ground milling machine according to claim 1,
wherein adjusting movement of the maintenance platform and/or the cover between the covering and maintenance positions is driven by a drive device.

17. The self-propelled ground milling machine according to claim 1,
wherein a latching device is provided which is implemented in such a manner that it fixes the maintenance platform and/or the cover in the maintenance position.

18. The self-propelled ground milling machine according to claim 1,
wherein the self-propelled ground milling machine comprises a milling drum arranged on a machine frame.

19. The self-propelled ground milling machine according to claim 18,
wherein the maintenance platform and the cover are articulated to the machine frame of the self-propelled ground milling machine.

20. The self-propelled ground milling machine according to claim 18,
wherein the maintenance platform is arranged on the self-propelled ground milling machine in such a manner that, in the maintenance position, the maintenance platform is situated essentially at the level of a floor surface of the operator platform.

21. The self-propelled ground milling machine according to claim 18,
wherein the maintenance platform is arranged in a working direction (a) of the self-propelled ground milling machine behind the operator platform.

22. The self-propelled ground milling machine according to claim 18,
wherein the operator platform of the self-propelled ground milling machine comprises a roof which can be swiveled between a working position and a transport position, the roof being able to be swiveled forwardly in a working direction from the working position to the transport position.

23. The self-propelled ground milling machine according to claim 1,
wherein the maintenance platform is part of the cover with its exterior side and thus part of the engine compartment enclosure.

24. A self-propelled ground milling machine, comprising:
a drive engine arranged in an engine compartment and an engine compartment enclosure which covers the engine compartment at least partly on sides and to a top of the engine compartment, at least a part of the engine compartment enclosure being a cover which is adjustable between a covering position and a maintenance position,
wherein a movable maintenance platform is provided which is mounted on the ground milling machine so as to move between a stowage position and a maintenance position, the maintenance platform being part of the cover with an exterior side of the maintenance platform being part of the engine compartment enclosure and comprising a floor surface for an operator from which said operator can carry out maintenance work in the engine compartment, and the maintenance platform being adjustable together with the cover in such a manner that an adjustment of the maintenance platform to the maintenance position occurs with the adjustment of the cover to the maintenance position, and an adjustment of the maintenance platform to the stowage position occurs with the adjustment of the cover to the covering position,
and further wherein the cover and the maintenance platform can swivel about a common swivel axis.

25. A self-propelled ground milling machine, comprising:
a drive engine arranged in an engine compartment and an engine compartment enclosure which covers the engine compartment at least partly on sides and to a top of the engine compartment, at least a part of the engine compartment enclosure being a cover which is adjustable between a covering position and a maintenance position,
wherein a movable maintenance platform is provided which is mounted on the ground milling machine so as to move between a stowage position and a maintenance position, the maintenance platform being part of the cover with an exterior side of the maintenance platform being part of the engine compartment enclosure and comprising a floor surface for an operator from which said operator can carry out maintenance work in the engine compartment, and the maintenance platform being adjustable together with the cover in such a manner that an adjustment of the maintenance platform to the maintenance position occurs with the adjustment of the cover to the maintenance position, and an adjustment of the maintenance platform to the stowage position occurs with the adjustment of the cover to the covering position, and further wherein the cover and/or the maintenance platform are mounted on the ground milling machine so as to be linearly displaceable between the covering position and/or the stowage position and the respective maintenance position.

* * * * *